United States Patent
Tanaka et al.

[11] Patent Number: 6,157,012
[45] Date of Patent: Dec. 5, 2000

[54] METHOD OF MANUFACTURING AN OPTICAL MODULE USING MULTIPLE APPLICATIONS OF THERMOSETTING RESINS AND MULTIPLE HEATING PROCESSES

[75] Inventors: Hiroyuki Tanaka; Hideki Hashizume, both of Osaka, Japan

[73] Assignee: Nippon Sheet Glass Co., Ltd., Osaka, Japan

[21] Appl. No.: 09/386,805

[22] Filed: Aug. 31, 1999

[30] Foreign Application Priority Data

Sep. 7, 1998 [JP] Japan ................... 10-252498

[51] Int. Cl.$^7$ ................... G02B 6/36
[52] U.S. Cl. ................ 219/633; 156/272.2; 156/273.3; 156/275.3; 156/290; 257/98; 385/93
[58] Field of Search ................... 219/633, 647; 156/272.2, 273.3, 273.5, 275.1, 275.3, 275.5, 290, 291, 295; 385/88–94; 257/98–100

[56] References Cited

U.S. PATENT DOCUMENTS

| | | |
|---|---|---|
| 4,547,039 | 10/1985 | Caron et al. . |
| 4,747,656 | 5/1988 | Miyahara et al. . |
| 5,127,073 | 6/1992 | Mulholland et al. . |
| 5,140,663 | 8/1992 | Edwards et al. . |
| 5,189,716 | 2/1993 | Matsubara et al. ............ 385/93 |
| 5,522,001 | 5/1996 | Meadowcroft ............ 385/91 |
| 5,631,990 | 5/1997 | Hashizume . |
| 5,692,083 | 11/1997 | Bennett ............ 385/91 |
| 5,751,877 | 5/1998 | Ishizaka et al. ............ 385/93 |
| 5,916,407 | 6/1999 | Gruenwald et al. ............ 156/235 |

FOREIGN PATENT DOCUMENTS

| | | | |
|---|---|---|---|
| 60-192907 | 10/1985 | Japan ............ | 385/92 |
| 1-105903 | 4/1989 | Japan ............ | 385/91 |
| 1-120515 | 5/1989 | Japan ............ | 385/91 |
| 2-1805 | 1/1990 | Japan ............ | 385/92 |
| 3-34725 | 7/1991 | Japan . | |
| 4-165312 | 11/1992 | Japan . | |
| 6-67063 | 3/1994 | Japan . | |

*Primary Examiner*—John A. Jeffery
*Attorney, Agent, or Firm*—Merchant & Gould P.C.

[57] ABSTRACT

An optical module has a housing of synthetic resin incorporating a lens therein and a semiconductor device of a metal-cap package structure which is held in optical axis alignment with the lens. The optical module is manufactured in provisional and final fixing stages. In the provisional fixing stage, a first thermosetting resin is applied as a plurality of spaced dots to surfaces, to be joined, of a stem of the semiconductor device and an end of the housing, the lens and the semiconductor device are held in optical axis alignment with each other, and a high-frequency current is supplied to a coil extending around the stem to heat the stem to thermoset the first thermosetting resin by high-frequency induction heating. In the final fixing stage, a second thermosetting resin is deposited in a circumferential pattern on an outer circumferential surface of the stem along the end of the housing, and the second thermosetting resin is thermoset by heating.

4 Claims, 3 Drawing Sheets

METHOD OF MANUFACTURING AN OPTICAL MODULE USING MULTIPLE APPLICATIONS OF THERMOSETTING RESINS AND MULTIPLE HEATING PROCESSES

BACKGROUND OF THE INVENTION

1. Field of the Invention

The present invention relates to a method of manufacturing an optical module having a semiconductor light-emitting or -detecting device of a metal-cap package structure and a lens which are held in alignment with each other by a housing of synthetic resin. More particularly, the present invention relates to a method of manufacturing such an optical module by assembling the semiconductor light-emitting or -detecting device and the housing through two fixing stages, i.e., a provisional fixing stage based on the high-frequency induction heating of a first thermosetting resin and a final fixing stage based on the atmospheric heating of a second thermosetting resin.

2. Description of the Related Art

Optical modules are an optical assembly comprising a semiconductor device, e.g., a semiconductor light-emitting device such as a laser diode or a semiconductor light-detecting device such as a photodiode, and a lens that are held in alignment with each other. Such optical modules are used in the field of optical communications, etc. For example, computers for data communications have a pair of optical modules, i.e., a semiconductor light-emitting device and a semiconductor light-detecting device, mounted on a board. Specifically, those optical modules comprise a semiconductor device, a lens, and a housing which holds the semiconductor device and the lens and retains the ferrule of an optical plug which is connected to the optical module. When the optical plug is connected to the optical module, the semiconductor device and the optical fiber in the ferrule are optically coupled to each other by the lens.

The lens incorporated in the optical module is mostly a spherical lens because it can easily be manufactured to high dimensional precision only by a mechanical process, is inexpensive, and can easily be assembled as it has no directivity and hence requires no orientational adjustments upon installation. Other lenses that find use in optical modules include an aspherical lens and a gradient-index rod lens. These lenses are normally fixedly assembled in respective housings by a bonding or fusing process. According to the bonding process, the lens is dropped into and positioned in a lens mount cavity in the housing, and thereafter coated with an adhesive of synthetic resin, which is then thermoset to secure the lens in place. According to the fusing process, after the lens is placed in the lens mount, a glass ring having a low melting point is placed around the lens and then melted with heat to hold the lens in position.

Heretofore, the housing which holds the semiconductor device and the lens has been a metal housing in most applications. Recently, however, housings molded of synthetic resin are widely used because they can easily be manufactured, can hold lenses securely in place, and can be manufactured inexpensively. For example, these molded housings can incorporate a lens that is assembled as a built-in lens according to an insert molding process, or can support a lens with a plurality of teeth. The semiconductor device is mostly in the form of a semiconductor element sealed by a package which comprises a metal cap.

Generally, a semiconductor device of a metal-cap package structure is fixedly mounted in a housing of synthetic resin with a built-in lens by coating a thermosetting resin such as an epoxy resin on an outer circumferential surface of the stem of the package along an end of the housing, and then thermosetting the resin in a heated atmosphere or at room temperature.

According to the above assembling process, the lens and the semiconductor device need to be maintained in their respective positions for accurate optical axis alignment by a jig while the thermosetting resin is being coated on the stem and until the coated thermosetting resin is fully thermoset. Since it takes several tens of minutes before the coated thermosetting resin is fully thermoset, the assembling procedure has been highly inefficient. If the housing is made of metal, then the semiconductor device can be fixed to the housing quickly, efficiently, and firmly by a welding process. However, such a welding process is not applicable to the molded housing.

One possible solution would be to bond the semiconductor device quickly to the housing with an ultraviolet-curable adhesive. However, the ultraviolet-curable adhesive is disadvantageous in that it fails to provide a sufficiently high level of bonding strength, tends to leave an uncured layer due to adhesive flows on an inner housing wall, and has a relatively low level of weather resistance.

SUMMARY OF THE INVENTION

It is an object of the present invention to provide a method of manufacturing an optical module by assembling a semiconductor device of a metal-cap package structure and a housing of synthetic resin highly accurately and efficiently with a sufficient level of bonding strength for a high level of weather resistance.

According to the present invention, there is provided a method of manufacturing an optical module having a housing of synthetic resin incorporating a lens therein and a semiconductor device of a metal-cap package structure which is held in optical axis alignment with the lens, comprising the steps of applying a first thermosetting resin as a plurality of spaced dots to surfaces, to be joined, of a stem of the semiconductor device and an end of the housing, holding the lens and the semiconductor device in optical axis alignment with each other, supplying a high-frequency current to a coil extending around the stem to heat the stem to thermoset the first thermosetting resin according to high-frequency induction heating, depositing a second thermosetting resin in a circumferential pattern on an outer circumferential surface of the stem along the end of the housing, and thermosetting the second thermosetting resin by heating.

According to the present invention, there is also provided a method of manufacturing an optical module having a housing of synthetic resin incorporating a lens therein and holding a ferrule of an optical plug and a semiconductor device of a metal-cap package structure which is held in optical axis alignment with the lens and the ferrule, comprising the steps of applying a first thermosetting resin as a plurality of spaced dots to surfaces, to be joined, of a stem of the semiconductor device and an end of the housing, holding the lens, the ferrule, and the semiconductor device in optical axis alignment with each other, supplying a high-frequency current to a coil extending around the stem to heat the stem to thermoset the first thermosetting resin by high-frequency induction heating, depositing a second thermosetting resin in a circumferential pattern on an outer circumferential surface of the stem along the end of the housing, and thermosetting the second thermosetting resin by atmospheric heating.

It is known in the art that when a high-frequency current is supplied to a coil, any metallic materials surrounded by the coil are induction-heated by the high-frequency current flowing in the coil. The principles of such high-frequency contact-free induction heating are applied to a high-frequency induction heating furnace, for example. According to the present invention, the high-frequency induction heating is used to thermoset an adhesive in provisionally bonding the stem of the semiconductor device to the housing. Heretofore, a heater for thermosetting an adhesive needs to be incorporated in a device for holding the lens and the semiconductor device in optical axis alignment with each other, resulting in substantial limitations on the structure of an apparatus for manufacturing optical modules. Since the high-frequency induction heating according to the present invention is contact-free induction heating, an apparatus, inclusive of the heater, for manufacturing optical modules may be relatively small in size. The adhesive suitable for the high-frequency induction heating should meet requirements for quick hardening capability, peel-off protection in subsequent steps, easy handling, and adequate viscosity, and is preferably a two-part epoxy resin having a viscosity of 3 kcps, for example.

After the semiconductor device and the housing are provisionally bonded to each other, they can remain joined in optical axis alignment without the use of a holding jig. Thereafter, the semiconductor device and the housing are finally bonded to each other according to a curing bonding process using a two-part epoxy resin having a viscosity ranging from 40 to 50 kcps, for example, which is thermoset by atmospheric heating over a relatively long period of time.

The above and further objects, details and advantages of the present invention will become apparent from the following detailed description of a preferred embodiment thereof, when read in conjunction with the accompanying drawings.

DETAILED DESCRIPTION OF THE PREFERRED EMBODIMENT

Figure 1:
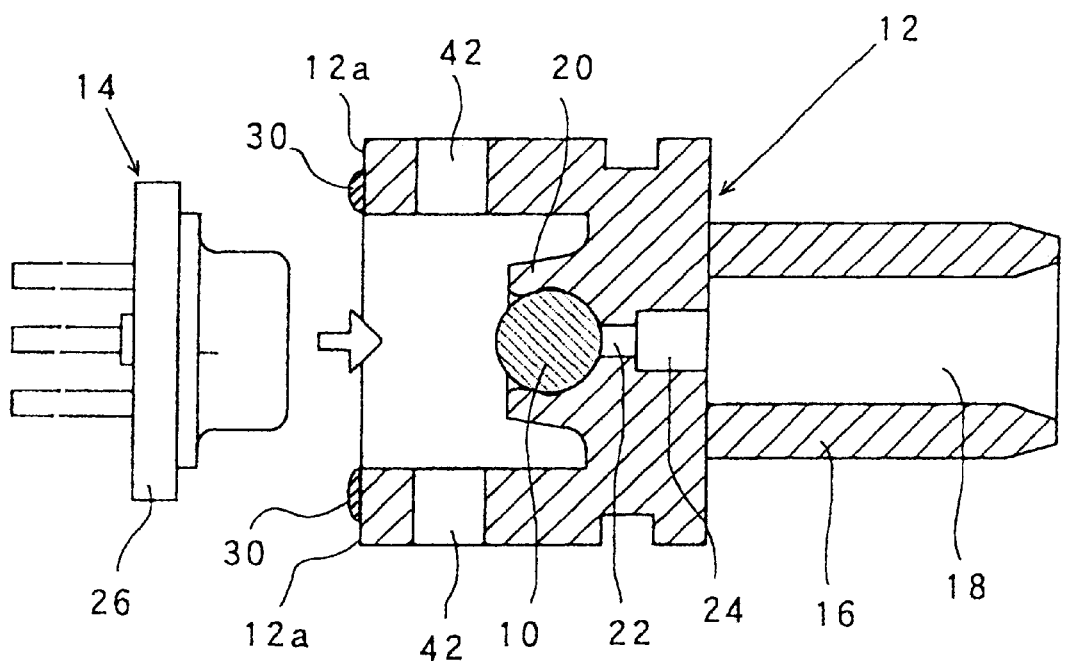
FIG. 1 is a cross-sectional view illustrative of a method of manufacturing an optical module according to the present invention.

FIG. 1 illustrates a method of manufacturing an optical module according to the present invention.

As shown in FIG. 1, a housing 12 of synthetic resin has a spherical lens 10 incorporated therein and holds the ferrule (not shown) of an optical plug extending from an optical component connected to the optical module. A laser diode (semiconductor device) 14 comprising a semiconductor element sealed by a package which comprises a metal cap is attached to the housing 12. When the optical plug is connected to the housing 12, the laser diode 14 and the optical fiber of the ferrule are relatively positioned for optical axis alignment so that the laser diode 14 and the optical fiber will be optically coupled to each other by the spherical lens 10.

The housing 12 is an integrally molded part that is substantially cylindrical in shape. The housing 12 has a larger-diameter end 12a for supporting the laser diode 14 thereon, an inner central portion which houses the spherical lens 10 therein, and a smaller-diameter receptacle 16 extending from the inner central portion remotely from the end 12a. The receptacle 16 has a bore 18 defined axially therein for receiving the ferrule of the optical plug.

Figure 2:
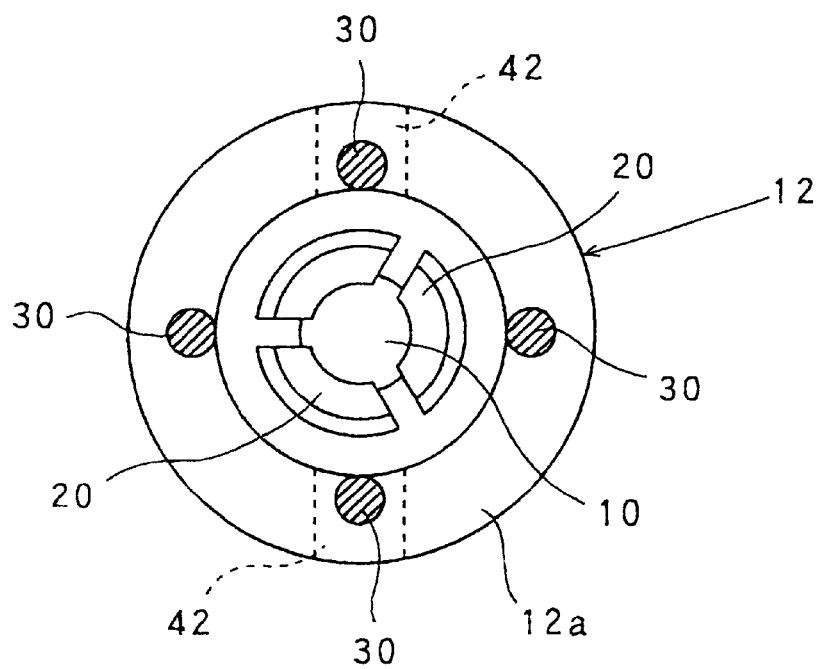
FIG. 2 is an elevational view showing the manner in which a first thermosetting resin is coated on a housing of synthetic resin for provisional fixing of a semiconductor device.

The inner central portion of the housing 12 includes a plurality of angularly spaced teeth 20 disposed around the central axis of the housing 12 and having respective distal ends projecting toward the laser diode 14. The teeth 20 have distal end portions overhanging radially inwardly in gripping relation to the spherical lens 10 which is retained in a lens mount cavity defined jointly by the teeth 20. In the illustrated embodiment, there are three teeth 20 angularly spaced at equal angular intervals, as shown in FIG. 2. The inner central portion of the housing 12 also has a smaller-diameter axial hole 22 defined therein and extending from the lens mount cavity at inner proximal ends of the teeth 20 in a direction away from the spherical lens 10 and a larger-diameter axial hole 24 defined therein and extending continuously from the smaller-diameter axial hole 22 to an inner end of the bore 18. The holes 22, 24 and the bore 18 have respective axes held in alignment with the optical axis of the housing 12, and jointly serve as a passage for an optical beam.

The teeth 20 and the remainder of the housing 12 are injection-molded integrally with each other. Specifically, the overhanging distal end portions of the teeth 20 can be formed by a core pin to be inserted centrally in a mold for the housing 12, the core pin having a constricted region in the proximal end of a spherical distal end portion thereof. Immediately after the synthetic resin is injected into the mold, the core is forcibly pulled out of the mold, thus leaving the overhanging distal end portions of the teeth 20.

In an experiment, the housing 12 was molded of a low-anisotropy liquid crystal polymer in which about 50 weight percent of glass beads having an average particle diameter of about 20 $\mu$m was dispersed. Liquid crystal polymers themselves are highly anisotropic, i.e., they have a substantially zero coefficient of linear expansion in the direction in which they are injected and a coefficient of linear expansion of about $8 \times 10^{-5}/°$ C. in a direction normal to that direction. However, the anisotropy of liquid crystal polymers can be reduced by dispersing a suitable amount of glass beads therein. Specifically, liquid crystal polymers with dispersed glass beads have coefficients of linear expansion of about $2 \times 10^{-5}/°$ C. in both the direction in which they are injected and a direction normal to that direction. With the housing 12 molded of such a low-anisotropy liquid crystal polymer, it was possible to reduce any changes in the inside diameter of the receptacle 16 to 0.005 mm in a temperature range from −20° C. to +75° C. in which the optical module was actually used.

The spherical lens 10 is securely installed in the housing 12 as follows: The housing 12 is supported in position with the end 12a facing upwardly, and the spherical lens 10 is placed on the distal ends of the teeth 20. Then, the spherical lens 10 is forced into the lens mount cavity among the teeth 20 by a rod-shaped presser (not shown). As the spherical lens 10 is forced into the lens mount cavity, the teeth 20 are flexed radially outwardly under the tenacity of the synthetic resin thereof. The spherical lens 10 as it is forced into the lens mount cavity is finally held against a lens seat at the bottom of the lens mount cavity and positioned on the lens seat, whereupon the teeth 20 spring back radially inwardly and recover their original shape. The spherical lens 10 is gripped and firmly held in position under the recovering forces of the teeth 20.

Then, the laser diode 14 is installed on the housing 12 with the spherical lens 10 thus housed therein. Specifically, the metal cap of the laser diode 14 is inserted in the housing 12 and aligned therewith with the laser diode 14 having a stem 26 held against the end 12a. Then, the laser diode 14 is bonded to the housing 12 through two fixing stages, i.e., a provisional fixing stage of high-frequency induction heating and a final fixing stage of atmospheric heating.

Figure 3A:
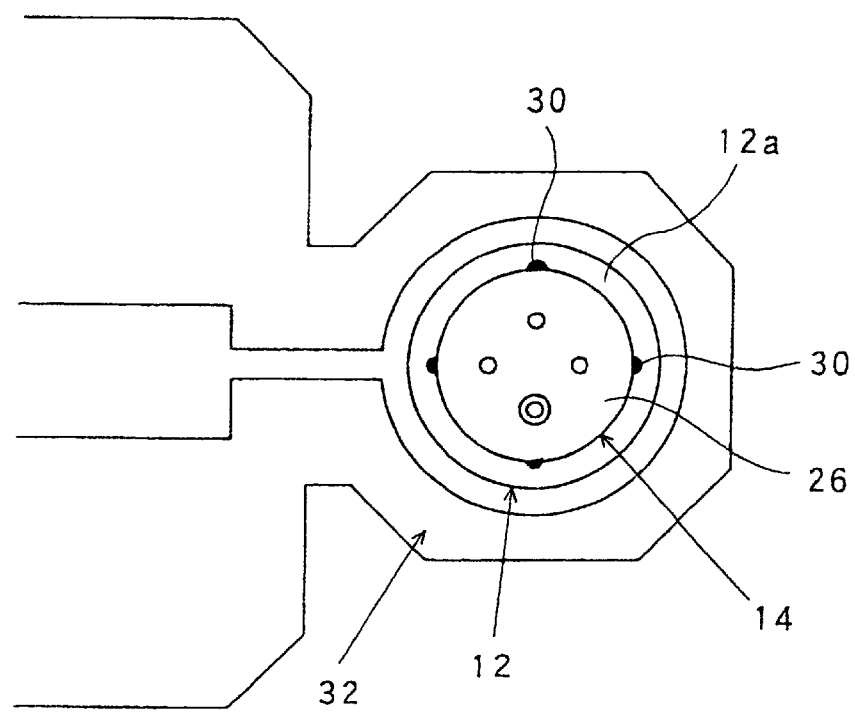
FIGS. 3A and 3B are plan and side elevational views, respectively, illustrative of a provisional fixing stage of the method according to the present invention.
Figure 3B:
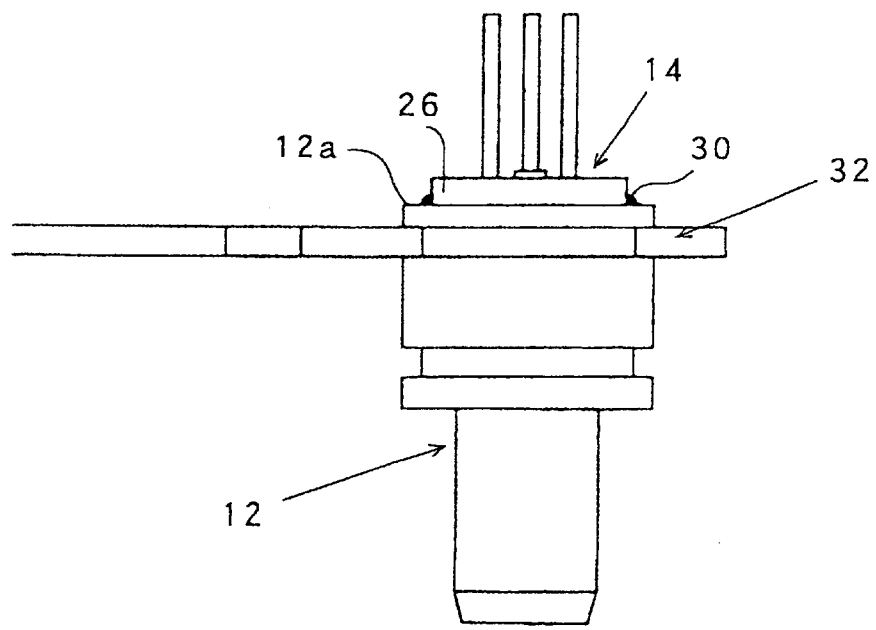

The provisional fixing stage is carried out as follows:

As shown in FIG. 2, a first thermosetting resin (adhesive) 30 is coated as four dots, each having a diameter of 1 mm or less and a desired thickness, at equal angular intervals by a dispenser on the end 12a of the housing 12. The first thermosetting resin 30 comprises a two-component or two-part epoxy resin whose viscosity is 3 kcps/Tg=124° C. Then, the stem 26 of the laser diode 14 is joined to the housing 12, and a single coil 32, i.e., a metal sheet coil of one turn, as shown in FIGS. 3A and 3B is placed around the stem 26 in spaced relation thereto. After the housing 12 and the laser diode 14 are positioned for optical axis alignment, they are held in the aligned position, and then the coil 32 is supplied with a high-frequency current. For example, a current of about 2 A at a frequency of 2 MHz with a power of about 600 W is supplied to the coil 32 for about 15 seconds. Eddy currents flow in the stem 26, heating the stem 26 up to about 200° C.

The laser diode 14 may be held in position by a ring of ceramics which has a shape complementary to the laser diode 14. Specifically, the laser diode 14 may be held by the ring using a holder which is made of a synthetic resin, such as a phenolic resin, of low thermal conductivity and shaped like a drill collet. If the holder were made of a general metallic material such as stainless steel, then the heat produced upon high-frequency heating would be absorbed by the holder, making it difficult to heat the laser diode 14 sufficiently. If the holder were made of a highly thermally insulative synthetic resin such as super engineering plastics, then the holder would excessively retain the heat, and hence would easily be damaged, e.g., softened or melted. In addition, the holder would suffer an intensive heat impact, tending to displace the laser diode 14 out of the desired optical axis. According to the present invention, however, the ring and the holder which are of the materials described above are effective to solve the above problems, allow optical modules to be mass-produced, and greatly reduce power fluctuations due to optical axis deviations.

As the temperature of the stem 26 is increased by the eddy currents, the epoxy resin used as the first thermosetting resin 30 becomes less viscous and then hardened. At this time, the dots of the epoxy resin first flow into a ring pattern around the end 12a and are then hardened. Since the epoxy resin is heated and hardened in a short period of time, any optical axis deviation of the laser diode 14 due to a heat impact is reduced to 6 μm or less, and hence any power fluctuation is reduced to 5% or less. The laser diode 14 and the housing 12 are thus provisionally secured to each other with a sufficient bonding strength (tensile strength≦5 kgf) while they are being kept in accurate optical axis alignment with each other.

Figure 4:
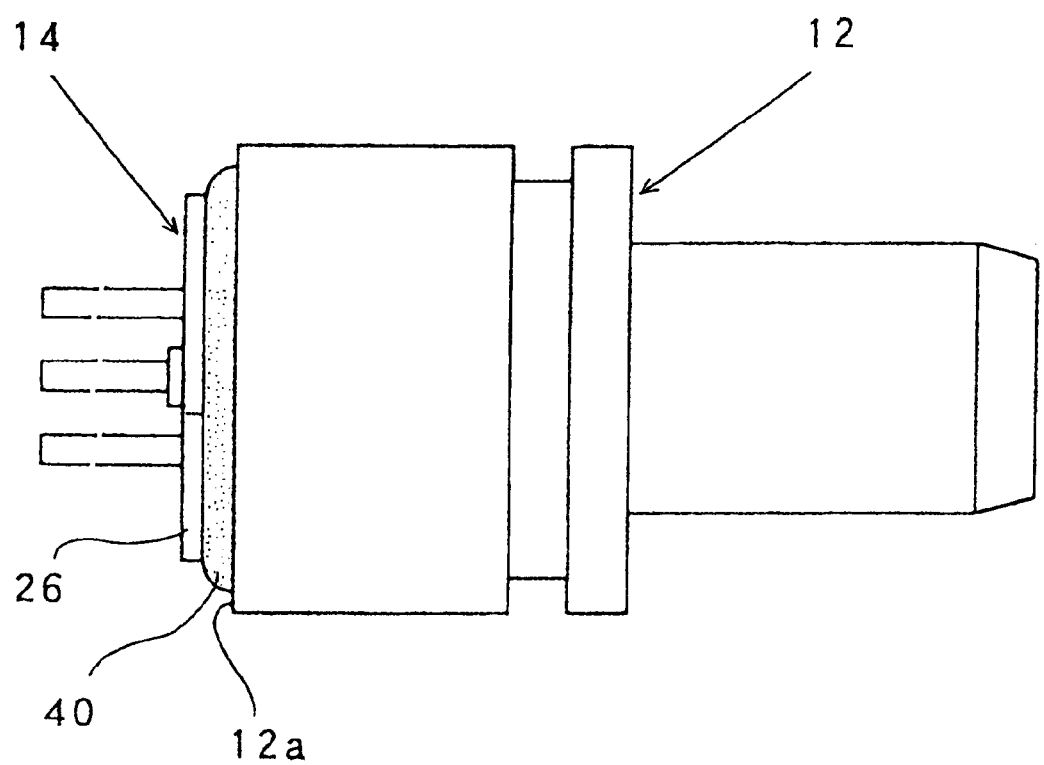
FIG. 4 is a side elevational view illustrative of a final fixing stage of the method according to the present invention.

The provisional assembly of the laser diode 14 and the housing 12 is not strong enough and hence not practical for actual use. In the final fixing stage, the laser diode 14 and the housing 12 are bonded according to a curing bonding process. Specifically, as shown in FIG. 4, a second thermosetting resin 40, i.e., a two-part epoxy resin whose viscosity ranges from 40 to 50 kcps/Tg=120° C., is deposited in a circumferential pattern on the entire outer circumferential surface of the stem 26 along the end 12a of the housing 12. Then, the deposited second thermosetting resin 40 is thermoset by atmospheric heating, i.e., at about 100° C. for about 2 hours, thus finally fixing the laser diode 14 to the housing 12. In an experiment, the initial bonding strength of the laser diode 14 and the housing 12 which were thus finally fixed to each other was 25 kgf or higher, providing characteristics that are almost the same as those of the conventional metallic optical module at a high temperature of 85° C. and a high humidity of 85%.

When the optical plug is connected to the optical module thus assembled, the ferrule of the optical plug is fitted into the receptacle 16. At this time, if the semiconductor device 14 comprises a laser diode, then a light beam emitted by the laser diode 14 is converged by the spherical lens 10 onto the end face of the optical fiber in the ferrule. If the semiconductor device 14 comprises a photodiode, then a light beam from the end face of the optical fiber in the ferrule is converged by the spherical lens 10 onto the photodiode 14.

In FIG. 1, the housing 12 has a pair of diametrically opposite holes 42 defined in a side wall thereof between the end 12a and the inner central portion of the housing 12. The holes 42 allow air to flow between the exterior of the housing 12 and the interior of the housing 12 for thereby preventing humidity from being condensed inside the housing 12 due to changes in the ambient temperature.

In the illustrated embodiment, the housing 12 is of such a structure that it includes the receptacle 16 as being integrally molded component. However, the housing may be of a structure free of any receptacle. An optical module with a housing free of any receptacle may be used as it is, or an optical module may have a separately fabricated receptacle joined to its housing. With the latter structure, the separately fabricated receptacle may be made of a material that is durable enough to protect itself against undue wear despite repeated insertion and removal of the ferrule of the optical plug.

The spherical lens 10 may be embedded in the housing 12 by an insert molding process, rather than being gripped by the teeth 20. Alternatively, the spherical lens 10 may be directly bonded to the housing 12 by an adhesive of glass or synthetic resin. In these modifications, the lens may comprise an aspherical lens or a gradient-index rod lens.

As described above, the optical module is manufactured by assembling a semiconductor device and a housing through two fixing stages, i.e., a provisional fixing stage based on the high-frequency induction heating of a first thermosetting resin and a final fixing stage based on the heating of a second thermosetting resin. These two fixing stages are effective to join the semiconductor device and the housing to each other highly accurately and efficiently with a sufficiently high level of bonding strength for high weather resistance, and allow optical modules to be mass-produced relatively inexpensively.

Although a certain preferred embodiment of the present invention has been shown and described in detail, it should be understood that the above description is intended to be illustrative, and not restrictive. Many other embodiments will be apparent to those of skill in the art upon reviewing the above description. The scope of the invention should, therefore, determined with reference to the appended claims, along with the full scope of equivalents to which such claims are entitled.

What is claimed is:

1. A method of manufacturing an optical module having a housing of synthetic resin incorporating a lens therein and a semiconductor device of a metal-cap package structure which is held in optical axis alignment with the lens, comprising the steps of:

applying a first thermosetting resin as a plurality of spaced dots to surfaces, to be joined, of a stem of the semiconductor device and an end of the housing;

holding the lens and the semiconductor device in optical axis alignment with each other;

supplying a high-frequency current to a coil extending around said stem to heat the stem to thermoset said first thermosetting resin by high-frequency induction heating;

depositing a second thermosetting resin in a circumferential pattern on an outer circumferential surface of said stem along the end of said housing; and thermosetting said second thermosetting resin by heating.

2. A method according to claim 1, wherein each of said first thermosetting resin and said second thermosetting resin comprises a two-part epoxy resin, said first thermosetting resin having a viscosity of 3 kcps, said second thermosetting resin having a viscosity ranging from 40 to 50 kcps.

3. A method of manufacturing an optical module having a housing of synthetic resin incorporating a lens therein and holding a ferrule of an optical plug and a semiconductor device of a metal-cap package structure which is held in optical axis alignment with the lens and the ferrule, comprising the steps of:

applying a first thermosetting resin as a plurality of spaced dots to surfaces, to be joined, of a stem of the semiconductor device and an end of the housing;

holding the lens, the ferrule, and the semiconductor device in optical axis alignment with each other;

supplying a high-frequency current to a coil extending around said stem to heat the stem to thermoset said first thermosetting resin by high-frequency induction heating;

depositing a second thermosetting resin in a circumferential pattern on an outer circumferential surface of said stem along the end of said housing; and thermosetting said second thermosetting resin by heating.

4. A method according to claim 2, wherein each of said first thermosetting resin and said second thermosetting resin comprises a two-part epoxy resin, said first thermosetting resin having a viscosity of 3 kcps, said second thermosetting resin having a viscosity ranging from 40 to 50 kcps.

* * * * *